Figure 1:
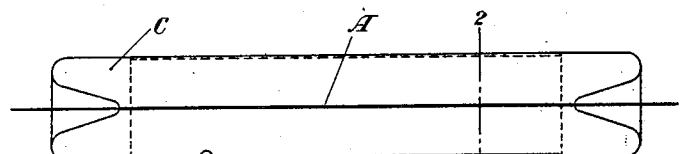

June 23, 1931.  R. K. POTTER  1,811,023
PHOTO ELECTRIC CELL
Filed Sept. 8, 1926

INVENTOR
R. K. Potter
BY
ATTORNEY

Patented June 23, 1931

1,811,023

UNITED STATES PATENT OFFICE

RALPH K. POTTER, OF NEW YORK, N. Y., ASSIGNOR TO AMERICAN TELEPHONE AND TELEGRAPH COMPANY, A CORPORATION OF NEW YORK

PHOTO-ELECTRIC CELL

Application filed September 8, 1926. Serial No. 134,298.

This invention relates to photo-electric cells, and more particularly to photo-electric cells having a photo-sensitive cathode, an anode, a source of voltage connected between the electrode terminals, and a gas content allowing ionization by collision.

In the usual form of photo-electric cell of this type, the output of the cell is proportional to the quantity or intensity of the incident light. It is the object of this invention to provide a satisfactory photo-electric cell which is responsive not only to variation in the quantity of the light but also to the displacement of an incident light beam of constant or varying intensity. Such a cell is advantageous, especially in certain reproduction methods in which it obviates the necessity of including special optical means as a part of the device.

In general, the cell embodying my invention is so arranged that the accelerating field over the region between the sensitive area of the cathode and the anode is graduated, the magnitude of the effective accelerating field being different for different positions of the light beam.

If the accelerating field between the electrodes of a photo-electric cell is sufficient to remove all of the electrons as fast as they are released from the cathode by an incident light beam, and if there is no gas present in the cell envelope, the output will depend solely upon the quantity of light. There will be no change in the output current with an increase of the anode potential. If, however, gas is present in the tube, the output is no longer a simple function of the quantity of incident light but depends upon the kind of gas, its pressure and temperature, the electrode spacing, and the strength of the accelerating field. The electrons released by the photo-electric action cause ionization of the gas if the mean free path of the gas molecules is shorter than the path between the electrodes and if the accelerating field is strong enough to give an electron a sufficient velocity before it strikes. In familiar types of cell many collisions take place in the distance between the cathode and the anode. Since each collision releases more electrons, the action is cumulative. The total output current of a photo-electric cell of such type may be represented by the following relation:

$$i = i_0 \epsilon \left[ p \, d \, N \epsilon^{(-NVpd/E)} \right]$$

in which
$i_0$ is the current due to photo-electric effect alone,
$\epsilon$ is natural logarithmic base (constant),
$p$ is the pressure of the gas in the cell,
$d$ is the distance between the electrodes,
$N$ and $V$ are the ionization constants, and
$E$ is the potential between the electrodes.

Figure 2:
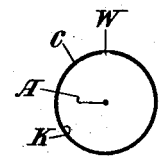
Figure 3:
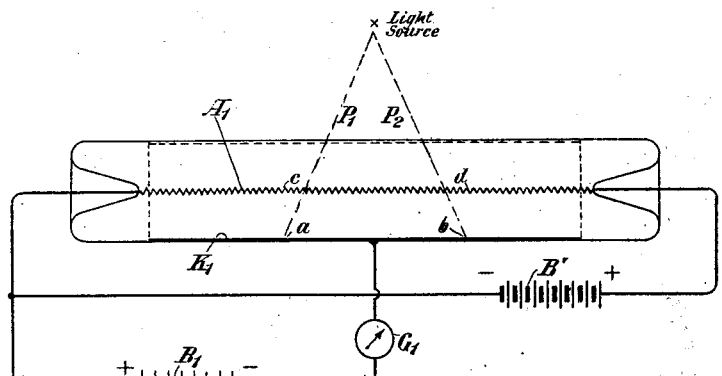
Figure 5:
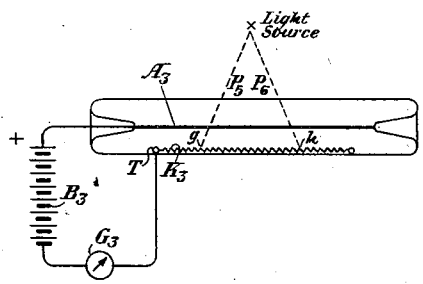
Figure 4:
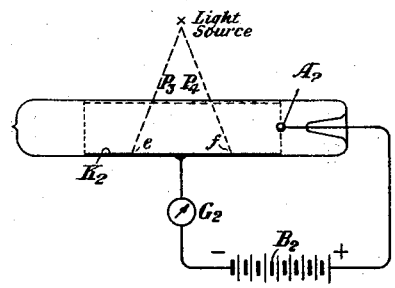
Figure 6:
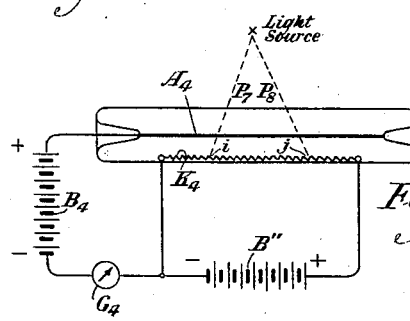

I propose to describe the structure and the operation of several desirable forms of cell based upon the principle indicated above. The embodiments of the invention will be more clearly understood when the following detailed description of the several forms is read with reference to the accompanying drawings. Figures 1 and 2 are longitudinal and sectional views illustrating the general principles of construction of a photo-electric cell; Fig. 3 is a preferred embodiment of the arrangement; and Figs. 4, 5 and 6 show modifications of the arrangement.

Figures 1 and 2 of the drawing show the essential elements of my photo-electric cell in one of its desirable forms. The evacuated cell envelope C contains the usual photo-sensitive cathode K and an axial anode A in the form of a wire conductor. Fig. 1 shows the cell in longitudinal section; Fig. 2 is a cross-sectional view of the cell taken on the line 2—2 of Fig. 1 and shows the slit or window W through which the light enters the cell.

In the embodiment of the invention shown diagrammatically in Fig. 3 of the drawing, the cell contains the photo-sensitive cathode $K_1$ and an anode $A_1$ which is of high resistance, this high resistance being indicated in the drawing by the diagrammatic showing of the anode. A battery $B'$ is connected across the terminals of the anode $A_1$, and the usual battery $B_1$ and the meter $G_1$ are connected between the cathode and one terminal of the anode as shown. Graduation of the accelerating field is accomplished by utilizing the potential drop along the anode $A_1$, the battery B' furnishing the potential. There is exerted by an electron released from a particular point on the cathode a force determined by the resultant field of the charges distributed the length of the anode. If the beam from the light source is in the position $P_1$ and falls upon the cathode at the point $a$, the accelerating force is determined approximately by the potential drop between the left end of the anode and a point $c$ opposite the point $a$ of the cathode. If, however, the incident light beam has the position $P_2$, striking the cathode at the point $b$, the controlling potential drop will be that between the left end of the anode and a point $d$ opposite the sensitized area of the cathode.

It is to be noted that the action of this form of cell is dependent upon a variation of "E" of the relation stated above.

The arrangement shown in Fig. 4 of the drawings is in effect the equivalent of the arrangement of Fig. 3 with the resistance of the anode increased to infinity. The cathode $K_2$ is the same as the cathode $K_1$ of Fig. 3. The anode $A_2$ takes the form of a small sphere, preferably, and may be mounted substantially in the position shown in the drawings. It is to be understood, however, that the form and position of the anode may be varied to produce the desired relation to the cathode. The battery $B_2$ and the meter $G_2$ are connected between the electrodes as shown. The force exerted upon an electron released at any point on the cathode is a function of the distance between the anode and the cathode point of incidence. By a proper adjustment of the shape of the anode and the space relation with respect to the cathode, a direct relation between the displacement of an incident beam and the variation of the output current may be obtained. More specifically, if the incident light beam has the position $P_3$, falling upon the cathode at the point $e$, the distance from the anode $A_2$ to the point $e$ determines the accelerating force. If the light beam takes the position $P_4$, there is a large increase in the accelerating force, since the sensitized point $f$ is now much nearer the anode.

The action of the cell of Fig. 4 depends upon a variation of "$d$" of the relation stated above.

In the arrangement shown in Fig. 5 of the drawings, the anode $A_3$ is of negligible resistance and the cathode $K_3$ is made highly resistive, as indicated diagrammatically in this figure of the drawing. A battery $B_3$ is connected between the anode and the terminal T of the cathode in series with the meter $G_3$. In this case again the point at which the light beam falls upon the cathode determines the strength of the accelerating field. The resultant potential between the anode and the cathode is that due to the battery $B_3$ minus the potential drop from the cathode terminal to the sensitized point of the cathode. If the light beam is in the position $P_5$, the resultant potential is the voltage of the battery $B_3$ minus the potential drop from the terminal T to the point $g$; if the light beam takes the position $P_6$, the resultant potential is the voltage of the battery minus the potential drop from T to the point $h$.

In the form of cell shown in Fig. 6 of the drawings, the anode $A_4$ is of negligible resistance and the cathode $K_4$ is highly resistive, as is the case with Fig. 5. The battery B" is connected across the terminals of the resistive cathode, and the battery $B_4$ and the meter $G_4$ are connected, as shown, between the anode and one terminal of the cathode. With this arrangement, the resultant potential is the algebraic sum of the voltage of battery $B_4$, the potential drop from the left end of the cathode to the sensitized point upon which the light beam falls (the battery B" furnishing the voltage), and the potential drop due to the space current flowing along the cathode to the point of electron release. For instance, if the light beam is in the position $P_7$, the resultant potential is the algebraic sum of the voltage of battery $B_4$, the potential drop from the left-hand terminal of the cathode to the point $i$, and the potential drop due to the space current flowing along the cathode to the point $i$; if the light beam takes the position $P_8$, the resultant potential is the algebraic sum of the voltage of battery $B_4$, the potential drop from the left-hand terminal of the cathode to the point $j$, and the potential drop due to the space current flowing along the cathode to the point $j$.

The action of the cell in the cases of Figs. 5 and 6 is dependent on a variation of "E" of the above-stated relation, as is the case with the cell of Fig. 3.

It will help to clarify the operation of my cell if the arrangement shown in Figs. 3 and 6 are viewed as being essentially potentiometer circuits, the movable arm being adjusted by the deflection of the incident light beam and having in series with it a resistance equal to the internal resistance of the cell under the conditions of operation.

It is to be understood that the form of the evacuated cell or chamber and other structural details may be changed from the specific showing of the drawing and that such other changes as fall within the scope of the appended claims may be made without a departure from the spirit of the invention.

The arrangement shown in Fig. 4, the arrangement shown in Fig. 5 and the arrangement shown in Fig. 6 are disclosed and more specifically claimed in my co-pending applications filed as of even date herewith and numbered 134,299, 134,300, and 134,301, respectively.

What is claimed is:

1. In a photo-electric device, an envelope, a photo-sensitive cathode and an anode therein, the envelope being adapted to admit the whole of a beam of light to fall upon said cathode at different points over a substantial range of displacement of the beam, means for impressing a voltage between said cathode and said anode, and means for varying the output current of the device in response to the displacement of an incident light beam.

2. In a photo-electric device, an envelope, a photo-sensitive cathode and an anode therein, the envelope being adapted to admit the whole of a beam of light to fall upon said cathode at different points over a substantial range of displacement of the beam, means for impressing a voltage between said cathode and said anode, and means for varying the output current of the device in response to and in proportion to the displacement of an incident light beam of constant intensity.

3. In a photo-electric device, an envelope, a photo-sensitive cathode and an anode therein, the envelope being adapted to admit the whole of a beam of light to fall upon said cathode at different points over a substantial range of displacement of the beam, means for impressing a voltage between said cathode and said anode, and means for varying the output current of the device in response to variation in quantity of the incident light and also varying said current in response to the displacement of an incident light beam.

4. In combination, a photo-electric cell comprising an envelope and a photo-sensitive cathode and an anode therein, said envelope being adapted to admit the whole of a beam of light to fall upon said cathode at different points over a substantial range of displacement of the beam, means for impressing a voltage between said cathode and said anode, and means for varying the potential gradient in response to the displacement of an incident light beam.

5. In combination, a photo-electric cell comprising an envelope and a photo-sensitive cathode and an anode therein, said envelope being adapted to admit the whole of a beam of light to fall upon said cathode at different points over a substantial range of displacement of the beam, means for impressing a voltage between said cathode and said anode, and means for varying the effective potential between said cathode and said anode in response to the displacement of an incident light beam.

In testimony whereof, I have signed my name to this specification this 4th day of September, 1926.

RALPH K. POTTER.